US011667229B2

(12) United States Patent
Renault

(10) Patent No.: US 11,667,229 B2
(45) Date of Patent: Jun. 6, 2023

(54) NATURAL GAS TANK PRESSURE CONTROL FOR TRANSPORT REFRIGERATION UNIT

(71) Applicants: Loic Renault, Saint Etienne du Rouvray (FR); Carrier Corporation, Palm Beach Gardens, FL (US)

(72) Inventor: Loic Renault, Saint Etienne du Rouvray (FR)

(73) Assignee: CARRIER CORPORATION, Palm Beach Gardens, FL (US)

(*) Notice: Subject to any disclaimer, the term of this patent is extended or adjusted under 35 U.S.C. 154(b) by 449 days.

(21) Appl. No.: 16/638,309

(22) PCT Filed: Aug. 18, 2017

(86) PCT No.: PCT/IB2017/001235
§ 371 (c)(1),
(2) Date: Feb. 11, 2020

(87) PCT Pub. No.: WO2019/034903
PCT Pub. Date: Feb. 21, 2019

(65) Prior Publication Data
US 2020/0164785 A1 May 28, 2020

(51) Int. Cl.
*B60P 3/20* (2006.01)
*B60K 15/03* (2006.01)
(Continued)

(52) U.S. Cl.
CPC .......... *B60P 3/20* (2013.01); *B60K 15/03006* (2013.01); *B60K 15/04* (2013.01);
(Continued)

(58) Field of Classification Search
CPC ..... B60P 3/20; B60K 15/03006; B60K 15/04; B60K 2015/03019; B60K 2015/03026;
(Continued)

(56) References Cited

U.S. PATENT DOCUMENTS 7,976,067 B2 7/2011 Naganuma et al.
8,443,820 B2 5/2013 Ulrey et al.
(Continued)

FOREIGN PATENT DOCUMENTS

CN 205503311 U 8/2016
DE 19531122 A1 * 2/1997 ........... B60H 1/3202
(Continued)

OTHER PUBLICATIONS

PCT Notification of Transmittal of The International Search Report for International Application No. PCT/IB2017/001235; dated Jan. 20, 2018; 1-7 pages U301328PCT.
(Continued)

*Primary Examiner* — Jacob M Amick
*Assistant Examiner* — Charles J Brauch
(74) *Attorney, Agent, or Firm* — Cantor Colburn LLP

(57) ABSTRACT

A transport refrigeration system (200) comprising: a vehicle (102) having a refrigerated cargo space (119); a refrigeration unit (22) in operative association with the refrigerated cargo space, the refrigeration unit providing conditioned air to the refrigerated cargo space; a first engine (26) configured to power the refrigeration unit; a plurality of first fuel tanks (330) fluidly connected to the first engine, the plurality of first fuel tanks configured to supply fuel to the first engine, wherein each of the plurality of first fuel tanks includes a lock off valve (450) and a pressure sensor (470) configured to detect a pressure level within each of the first fuel tanks; and one or more engine controllers (54) in electronic communication with each pressure sensor and lock off valve, the one or more engine controllers being configured to adjust at least one of the lock off valves in response to a pressure level detected by at least one of the pressure sensors.

11 Claims, 7 Drawing Sheets

(51) Int. Cl.
    *B60K 15/04*     (2006.01)
    *F02B 63/06*     (2006.01)
    *F02M 21/02*     (2006.01)
    *F25D 11/00*     (2006.01)

(52) U.S. Cl.
    CPC ......... *F02B 63/06* (2013.01); *F02M 21/0215* (2013.01); *F02M 21/0224* (2013.01); *F02M 21/0242* (2013.01); *F02M 21/0293* (2013.01); *F25D 11/003* (2013.01); *B60K 2015/03019* (2013.01); *B60K 2015/0321* (2013.01); *B60K 2015/03026* (2013.01); *B60K 2015/03256* (2013.01); *B60K 2015/0458* (2013.01)

(58) Field of Classification Search
    CPC .. B60K 2015/0321; B60K 2015/03256; B60K 2015/0458; F02B 63/06; F02M 21/0215; F02M 21/0224; F02M 21/0242; F02M 21/0293; F25D 11/003; F17C 2201/0109; F17C 2201/035; F17C 2201/056; F17C 2205/0142; F17C 2205/0326; F17C 2221/033; F17C 2221/038; F17C 2223/0123; F17C 2223/0161; F17C 2223/033; F17C 2223/035; F17C 2225/0123; F17C 2225/0161; F17C 2225/033; F17C 2225/035; F17C 2227/0157; F17C 2227/0325; F17C 2227/0346; F17C 2227/0355; F17C 2227/0393; F17C 2227/04; F17C 2250/032; F17C 2250/043; F17C 2250/0636; F17C 2250/077; F17C 2260/022; F17C 2260/024; F17C 2260/038; F17C 2265/066; F17C 2265/07; F17C 2270/0171; Y02T 10/30

See application file for complete search history.

(56) References Cited

U.S. PATENT DOCUMENTS

| | | |
|---|---|---|
| 8,707,937 B2 | 4/2014 | Elwart et al. |
| 9,579,969 B2 | 2/2017 | Crist et al. |
| 9,592,731 B2 | 3/2017 | Hanlin et al. |
| 2010/0307454 A1* | 12/2010 | Ulrey ................. F02M 21/0224 123/445 |
| 2014/0138045 A1 | 5/2014 | Sloane |
| 2014/0182561 A1 | 7/2014 | Ibizugbe, Jr. |
| 2016/0231043 A1 | 8/2016 | Casasanta et al. |
| 2016/0341188 A1 | 11/2016 | Tognarell et al. |

FOREIGN PATENT DOCUMENTS

| | | |
|---|---|---|
| DE | 19531122 A1 | 2/1997 |
| DE | 202013102467 U1 | 6/2013 |
| DE | 102015209806 A1 | 12/2016 |
| EP | 2287458 A2 | 2/2011 |
| JP | 2016081724 A | 5/2016 |
| KR | 20160072588 A | 6/2016 |
| KR | 20170014935 A | 2/2017 |
| WO | 2016130537 A1 | 8/2016 |
| WO | 2017100590 A1 | 6/2017 |

OTHER PUBLICATIONS

Written Opinion of the International Searching Authority for International Application No. PCT/IB2017/001235; dated Jan. 30, 2018; 1-7 pages.

Chinese Office Action for Application No. 201780096046.X; dated Jul. 29, 2021; 8 Pages.

Author Unknown "Natural Gas Innovation: One Food and Beverage Truck, And Now, One Alternative Fuel" Blog dated Jul. 7, 2015.

\* cited by examiner

Table of Contents# NATURAL GAS TANK PRESSURE CONTROL FOR TRANSPORT REFRIGERATION UNIT

CROSS-REFERENCE TO RELATED APPLICATIONS

This application is a National Stage Application of International Application No. PCT/IB2017/001235 filed Aug. 18, 2017, the disclosure of which is incorporated herein by reference in its entirety.

BACKGROUND

The subject matter disclosed herein generally relates to the field of transportation refrigeration systems, and more particularly to an apparatus and method of operating the fuel systems of such transport refrigeration systems.

Typically, cold chain distribution systems are used to transport and distribute cargo, or more specifically perishable goods and environmentally sensitive goods (herein referred to as perishable goods) that may be susceptible to temperature, humidity, and other environmental factors. Perishable goods may include but are not limited to fruits, vegetables, grains, beans, nuts, eggs, dairy, seed, flowers, meat, poultry, fish, ice, and pharmaceuticals. Advantageously, cold chain distribution systems allow perishable goods to be effectively transported and distributed without damage or other undesirable effects.

Refrigerated vehicles and trailers are commonly used to transport perishable goods in a cold chain distribution system. A transport refrigeration system is mounted to the vehicles or to the trailer in operative association with a cargo space defined within the vehicles or trailer for maintaining a controlled temperature environment within the cargo space.

Conventionally, transport refrigeration systems used in connection with refrigerated vehicles and refrigerated trailers include a transport refrigeration unit having a refrigerant compressor, a condenser with one or more associated condenser fans, an expansion device, and an evaporator with one or more associated evaporator fans, which are connected via appropriate refrigerant lines in a closed refrigerant flow circuit. Air or an air gas mixture is drawn from the interior volume of the cargo space by means of the evaporator fan(s) associated with the evaporator, passed through the airside of the evaporator in heat exchange relationship with refrigerant whereby the refrigerant absorbs heat from the air, thereby cooling the air. The cooled air is then supplied back to the cargo space.

On commercially available transport refrigeration systems used in connection with refrigerated vehicles and refrigerated trailers, the compressor, and typically other components of the transport refrigeration unit, must be powered during transit by a prime mover. In mechanically driven transport refrigeration systems the compressor is driven by the prime mover, either through a direct mechanical coupling or a belt drive, and other components, such as the condenser and evaporator fans are belt driven.

An "all electric" transport refrigeration system for a refrigerated trailer application is also commercially available through Carrier Corporation. In the all electric transport refrigeration system, a prime mover carried on and considered part of the transport refrigeration system, drives an AC synchronous generator that generates AC power. The generated AC power is used to power an electric compressor motor for driving the refrigerant compressor of the transport refrigeration unit and also powering electric AC fan motors for driving the condenser and evaporator motors and electric heaters associated with the evaporator.

The prime mover typically is an engine carried on and considered part of the transport refrigeration unit, while the vehicle includes a separate engine to power the vehicle. Commonly, the engine of the vehicle and the engine of the transport refrigeration unit utilize a single pressure sensor for multiple fuel tanks. The single pressure sensor averages the combined pressure of the fuel tanks to roughly estimate the amount of fuel within each fuel tank which makes it difficult to accurately measure fuel quantities in each individual tank, thus a more efficient solution is desired.

BRIEF DESCRIPTION

According to one embodiment, a transport refrigeration system is provided. The transport refrigeration system comprising: a vehicle having a refrigerated cargo space; a refrigeration unit in operative association with the refrigerated cargo space, the refrigeration unit providing conditioned air to the refrigerated cargo space; a first engine configured to power the refrigeration unit; a plurality of first fuel tanks fluidly connected to the first engine, the plurality of first fuel tanks configured to supply fuel to the first engine, wherein each of the plurality of first fuel tanks includes a lock off valve and a pressure sensor configured to detect a pressure level within each of the first fuel tanks; and one or more engine controllers in electronic communication with each pressure sensor and lock off valve, the one or more engine controllers being configured to adjust at least one of the lock off valves in response to a pressure level detected by at least one of the pressure sensors.

In addition to one or more of the features described above, or as an alternative, further embodiments may include a second engine configured to power the vehicle; and a plurality of second fuel tanks fluidly connected to the second engine, the plurality of second fuel tanks configured to supply fuel to the second engine, wherein each of the plurality of second fuel tanks includes a lock off valve and a pressure sensor configured to detect a pressure level within each of the second fuel tanks.

In addition to one or more of the features described above, or as an alternative, further embodiments may include a single filling point fluidly connected to the plurality of first fuel tanks and the plurality of second fuel tanks; wherein the single filling point is configured to receive fuel.

In addition to one or more of the features described above, or as an alternative, further embodiments may include that the single filling point is configured to distribute the fuel received to the plurality of first fuel tanks and the plurality of second fuel tanks.

In addition to one or more of the features described above, or as an alternative, further embodiments may include that the controller is configured to stop the fuel flow from one of the first fuel tanks to the first engine when at least one of a fuel leak and an obstruction is detected.

In addition to one or more of the features described above, or as an alternative, further embodiments may include that the controller is configured to stop the fuel flow from one of the second fuel tanks to the second engine when at least one of a fuel leak and an obstruction is detected.

In addition to one or more of the features described above, or as an alternative, further embodiments may include that the fuel is at least one of compressed natural gas and liquefied natural gas.

In addition to one or more of the features described above, or as an alternative, further embodiments may include that the fuel is at least one of compressed natural gas and liquefied natural gas.

According to another embodiment, a method of operating a transport refrigeration system is provided. The method comprising: powering a refrigeration unit using a first engine, the refrigeration unit being in operative association with a refrigerated cargo space and provides conditioned air to the refrigerated cargo space; storing fuel for the first engine in a plurality of first fuel tanks, the plurality of first fuel tanks fluidly connected to the first engine, wherein each of the plurality of first fuel tanks includes a lock off valve and a pressure sensor configured to detect a pressure level within each of the first fuel tanks; detecting the pressure level within each of the plurality of first fuel tanks; and adjusting one of the fuel lock off valves in response to the pressure level.

In addition to one or more of the features described above, or as an alternative, further embodiments may include that prior to the adjusting, the method further comprises: powering a vehicle using a second engine, the vehicle being connected to the refrigerated cargo space; storing fuel for the second engine in a plurality of second fuel tanks, the plurality of second fuel tanks fluidly connected to the second engine, wherein each of the plurality of second fuel tanks includes a lock off valve and a pressure sensor configured to detect a pressure level within each of the second fuel tanks; and detecting the pressure level within each of the plurality of second fuel tanks.

In addition to one or more of the features described above, or as an alternative, further embodiments may include: filling the plurality of first fuel tanks and the plurality of second fuel tanks through a single filling point, the single filling point fluidly connected to the plurality of first fuel tanks and the plurality of second fuel tanks.

In addition to one or more of the features described above, or as an alternative, further embodiments may include: detecting, using a controller, at least one of a fuel leak and an obstruction; and stopping fuel flow from one of the plurality of first fuel tanks to the first engine when at least one of the fuel leak and the obstruction is detected.

In addition to one or more of the features described above, or as an alternative, further embodiments may include: detecting, using a controller, at least one of a fuel leak and an obstruction; and stopping fuel flow from one of the plurality of second fuel tanks to the second engine when at least one of the fuel leak and the obstruction is detected.

In addition to one or more of the features described above, or as an alternative, further embodiments may include that the fuel is at least one of compressed natural gas and liquefied natural gas.

In addition to one or more of the features described above, or as an alternative, further embodiments may include that the fuel is at least one of compressed natural gas and liquefied natural gas.

Technical effects of embodiments of the present disclosure include utilizing a dedicated pressure sensor on each fuel tank in order to monitor fuel flow to the engine of a transport refrigeration system.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
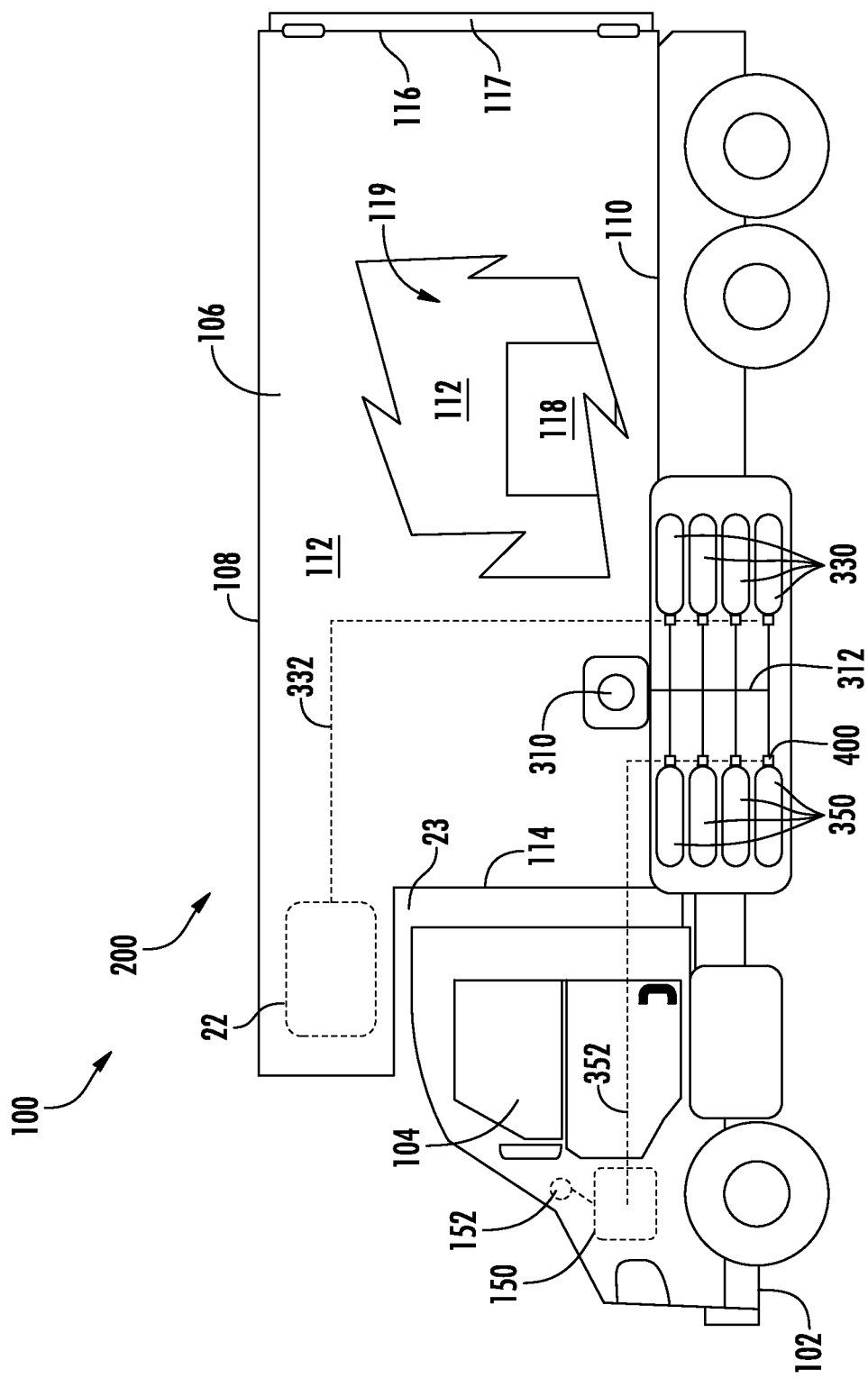
FIG. 1 is a schematic illustration of a transport refrigeration system having a single filling point, according to an embodiment of the present disclosure.
Figure 2:
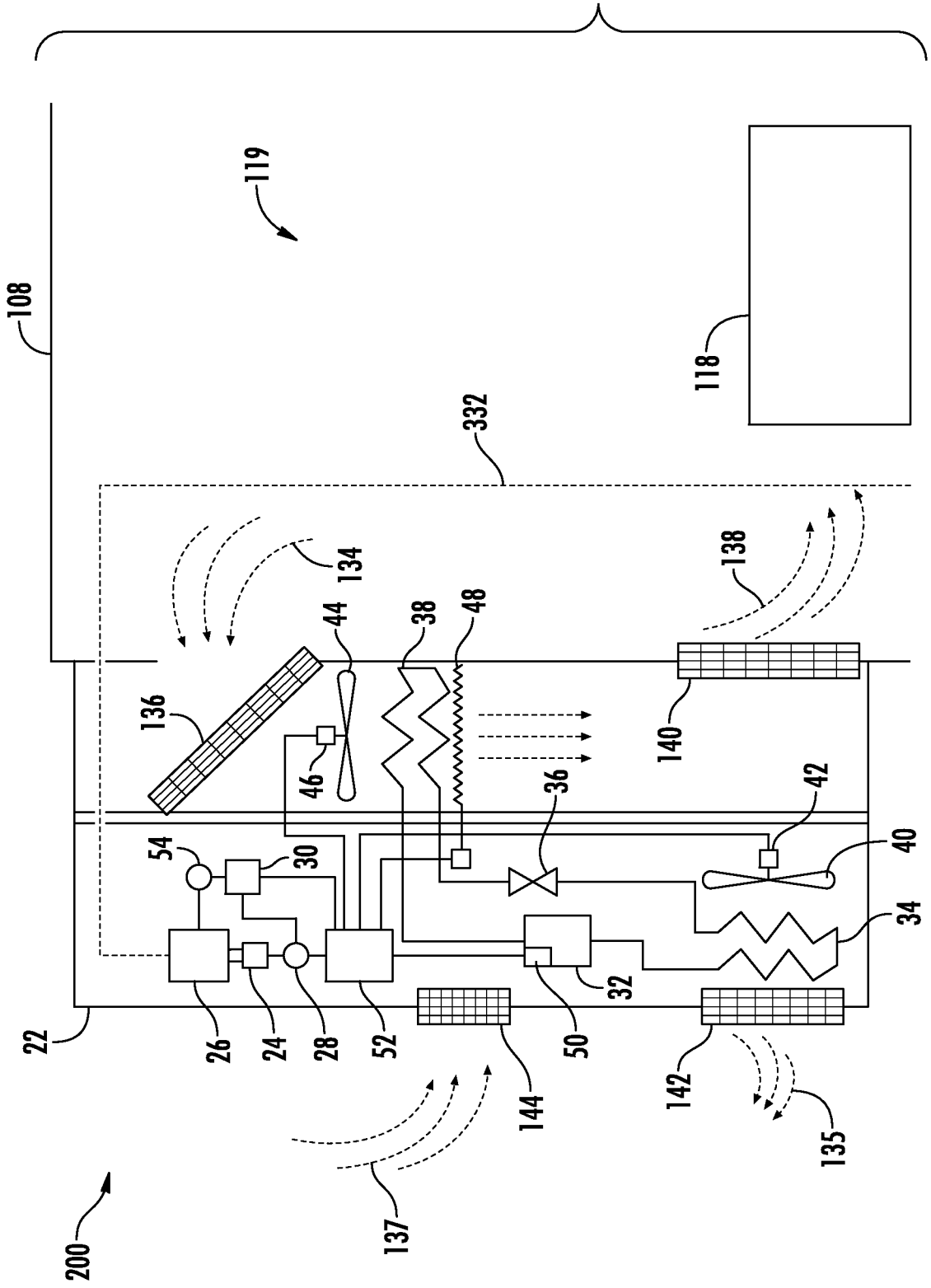
FIG. 2 is an enlarged schematic illustration of the transport refrigeration system of FIG. 1, according to an embodiment of the present disclosure.

Referring to FIGS. 1-2. FIG. 1 shows a schematic illustration of a transport refrigeration system 200 and FIG. 2 shows an enlarged schematic illustration of the transport refrigeration system 200 of FIG. 1. The transport refrigeration system 200 is being illustrated as a trailer system 100 as seen in FIG. 1. The trailer system 100 includes a vehicle 102 and a transport container 106. The vehicle 102 includes an operator's compartment or cab 104 and a second engine 150 which acts as the drive system of the trailer system 100. The second engine 150 may include an engine controller 152 configured to control the operation of the second engine 150. The engine controller 152 may be an electronic controller including a processor and an associated memory comprising computer-executable instructions that, when executed by the processor, cause the processor to perform various operations. The a processor may be but is not limited to a single-processor or multi-processor system of any of a wide array of possible architectures, including field programmable gate array (FPGA), central processing unit (CPU), application specific integrated circuits (ASIC), digital signal processor (DSP) or graphics processing unit (GPU) hardware arranged homogenously or heterogeneously. The memory may be a storage device such as, for example, a random access memory (RAM), read only memory (ROM), or other electronic, optical, magnetic or any other computer readable medium The fuel that powers the second engine 150 may be at least one of compressed natural gas and liquefied natural gas. In an embodiment, the fuel is compressed natural gas. In the illustrated embodiment, the fuel to power the second engine 150 of the vehicle 102 is stored in a plurality of second fuel tanks 350. The plurality of second fuel tanks 350 are fluidly connected to the second engine 150 through a second fuel line 352. The plurality of second fuel tanks 350 are configured to supply fuel to the second engine 150 through the second fuel line 352. The transport container 106 is coupled to the vehicle 102. The transport container 106 is a refrigerated trailer and includes a top wall 108, a directly opposed bottom wall 110, opposed side walls 112, and a front wall 114, with the front wall 114 being closest to the vehicle 102. The transport container 106 further includes a door or doors 117 at a rear wall 116, opposite the front wall 114. The walls of the transport container 106 define a refrigerated cargo space 119. It is appreciated by those of skill in the art that embodiments described herein may be applied to non-trailer refrigeration such as, for example a rigid truck or a truck having refrigerate compartment.

Typically, transport refrigeration systems 200 are used to transport and distribute perishable goods and environmentally sensitive goods (herein referred to as perishable goods 118). The perishable goods 118 may include but are not limited to fruits, vegetables, grains, beans, nuts, eggs, dairy, seed, flowers, meat, poultry, fish, ice, blood, pharmaceuticals, or any other suitable cargo requiring temperature controlled transport.

As seen in FIG. 2, the transport refrigeration system 200 includes a refrigeration unit 22, an electric generation device 24, a first engine 26 for driving the electric generation device 24, and a controller 30. The refrigeration unit 22 functions, under the control of the controller 30, to establish and regulate a desired environmental parameters, such as, for example temperature, pressure, humidity, carbon dioxide, ethylene, ozone, light exposure, vibration exposure, and other conditions in the interior compartment 119 as known to one of ordinary skill in the art. In an embodiment, the refrigeration unit 22 is a refrigeration system capable of providing a desired temperature and humidity range.

The refrigeration unit 22 includes a refrigerant compression device 32, a refrigerant heat rejection heat exchanger 34, an expansion device 36, and a refrigerant heat absorption heat exchanger 38 connected in refrigerant flow communication in a closed loop refrigerant circuit and arranged in a conventional refrigeration cycle. The refrigeration unit 22 also includes one or more fans 40 associated with the refrigerant heat rejection heat exchanger 34 and driven by fan motor(s) 42 and one or more fans 44 associated with the refrigerant heat absorption heat exchanger 38 and driven by fan motor(s) 46. The refrigeration unit 22 may also include a heater 48 associated with the refrigerant heat absorption heat exchanger 38. In an embodiment, the heater 48 may be an electric resistance heater. It is to be understood that other components (not shown) may be incorporated into the refrigerant circuit as desired, including for example, but not limited to, a suction modulation valve, a receiver, a filter/dryer, an economizer circuit.

The refrigerant heat rejection heat exchanger 34 may, for example, comprise one or more refrigerant conveying coiled tubes or one or more tube banks formed of a plurality of refrigerant conveying tubes across flow path to the heat outlet 142. The fan(s) 40 are operative to pass air, typically ambient air, across the tubes of the refrigerant heat rejection heat exchanger 34 to cool refrigerant vapor passing through the tubes. The refrigerant heat rejection heat exchanger 34 may operate either as a refrigerant condenser, such as if the refrigeration unit 22 is operating in a subcritical refrigerant cycle or as a refrigerant gas cooler, such as if the refrigeration unit 22 is operating in a transcritical cycle.

The refrigerant heat absorption heat exchanger 38 may, for example, also comprise one or more refrigerant conveying coiled tubes or one or more tube banks formed of a plurality of refrigerant conveying tubes extending across flow path from a return air inlet 136. The fan(s) 44 are operative to pass air drawn from the refrigerated cargo space 119 across the tubes of the refrigerant heat absorption heat exchanger 38 to heat and evaporate refrigerant liquid passing through the tubes and cool the air. The air cooled in traversing the refrigerant heat rejection heat exchanger 38 is supplied back to the refrigerated cargo space 119 through a refrigeration unit outlet 140. It is to be understood that the term "air" when used herein with reference to the atmosphere within the cargo box includes mixtures of air with other gases, such as for example, but not limited to, nitrogen or carbon dioxide, sometimes introduced into a refrigerated cargo box for transport of perishable produce.

The refrigerant compression device 32 may comprise a single-stage or multiple-stage compressor such as, for example, a reciprocating compressor or a scroll compressor. The compression device 32 has a compression mechanism (not shown) driven by an electric motor 50. In an embodiment, the motor 50 may be disposed internally within the compressor with a drive shaft interconnected with a shaft of the compression mechanism, all sealed within a common housing of the compression device 32.

The transport refrigeration system 200 also includes a controller 30 configured for controlling operation of the transport refrigeration system 200 including, but not limited to, operation of various components of the refrigerant unit 22 to provide and maintain a desired thermal environment within the refrigerated cargo space 119. The controller 30 may also be able to selectively operate the first engine 26, typically through an electronic engine controller 54 operatively associated with the first engine 26. The controller 30 and the engine controller 54 may be electronic controllers including a processor and an associated memory comprising computer-executable instructions that, when executed by the processor, cause the processor to perform various operations. The a processor may be but is not limited to a single-processor or multi-processor system of any of a wide array of possible architectures, including field programmable gate array (FPGA), central processing unit (CPU), application specific integrated circuits (ASIC), digital signal processor (DSP) or graphics processing unit (GPU) hardware arranged homogenously or heterogeneously. The memory may be a storage device such as, for example, a random access memory (RAM), read only memory (ROM), or other electronic, optical, magnetic or any other computer readable medium.

The refrigeration unit 22 has a plurality of power demand loads, including, but not limited to, the compression device drive motor 50, the drive motor 42 for the fan 40 associated with the refrigerant heat rejection heat exchanger 34, and the drive motor 46 for the fan 44 associated with the refrigerant heat absorption heat exchanger 38. In the depicted embodiment, the heater 48 also constitutes a power demand load. The electric resistance heater 48 may be selectively operated by the controller 30 whenever a control temperature within the temperature controlled cargo box drops below a preset lower temperature limit, which may occur in a cold ambient environment. In such an event the controller 30 would activate the heater 48 to heat air circulated over the heater 48 by the fan(s) 44 associated with the refrigerant heat absorption heat exchanger 38. The heater 48 may also be used to de-ice the return air intake 136.

The first engine 26 is an on-board fossil-fuel engine that drives the electric generation device 24, which generates electrical power. The fuel that powers the first engine 26 may be at least one of compressed natural gas and liquefied natural gas. In an embodiment, the fuel is compressed natural gas. In another embodiment, the fuel that powers the first engine 26 is the same fuel that powers the second engine 150 of the vehicle 102 in FIG. 1. In the illustrated embodiment, the fuel to power the first engine 26 is stored in a plurality of first fuel tanks 330. The plurality of first fuel tanks 330 are fluidly connected to the first engine 26 through a first fuel line 332. The plurality of first fuel tanks 330 are configured to supply fuel to the first engine 26 through the first fuel line 332.

The drive shaft of the engine drives the shaft of the electric generation device 24. In an electrically powered embodiment of the refrigeration unit 20, the electric generation device 24 may comprise a single on-board, engine driven AC generator configured to generate alternating current (AC) power including at least one AC voltage at one or more frequencies. In an embodiment, the electric generation device 24 may, for example, be a permanent magnet AC generator or a synchronous AC generator. In another embodiment, the electric generation device 24 may comprise a single on-board, engine driven DC generator configured to generate direct current (DC) power at at least one voltage. Some electric generation devices may have internal voltage regulators while other electric generation devices do not. As each of the fan motors 42, 46 and the compression device drive motor 50 may be an AC motor or a DC motor, it is to be understood that various power converters 52, such as AC to DC rectifiers, DC to AC inverters, AC to AC voltage/frequency converters, and DC to DC voltage converters, may be employed in connection with the electric generation device 24 as appropriate. The transport refrigeration system 200 may include a voltage sensor 28 to sense the voltage of the electric generation device 24.

Airflow is circulated into and through the refrigerate cargo space 119 of the transport container 106 by means of the refrigeration unit 22. A return airflow 134 flows into the refrigeration unit 22 from the refrigerated cargo space 119 through the refrigeration unit return air intake 136, and across the refrigerant heat absorption heat exchanger 38 via the fan 44, thus conditioning the return airflow 134 to a selected or predetermined temperature. The conditioned return airflow 134, now referred to as supply airflow 138, is supplied into the refrigerated cargo space 119 of the transport container 106 through the refrigeration unit outlet 140, which in some embodiments is located near the bottom wall 110 of the container system 106. Heat 135 is removed from the refrigerant heat rejection heat exchanger 34 through the heat outlet 142. The refrigeration unit 22 may contain an external air inlet 144, as shown in FIG. 2, to aid in the removal of heat 135 from the refrigerant heat rejection heat exchanger 34 by pulling in external air 137. The supply airflow 138 cools the perishable goods 118 in the refrigerated cargo space 119 of the transport container 106. It is to be appreciated that the refrigeration unit 22 can further be operated in reverse to warm the container system 106 when, for example, the outside temperature is very low. In the illustrated embodiment, the return air intake 136, the refrigeration unit outlet 140, the heat outlet 142, and the external air inlet 144 are configured as grilles to help prevent foreign objects from entering the refrigeration unit 22.

In the illustrated embodiment, the transport refrigeration system 200 includes a single filling point 310. The single filling point 310 is fluidly connected to the plurality of second fuel tanks 350 and the plurality of first fuel tanks 330 through a filling line 312. The single filling point 310 is configured to receive fuel from a filling station, such as for example a gas station. When the single filling point 310 receives fuel, the single filling point 310 distributes the fuel received to the plurality of second fuel tanks 350 and the plurality of first fuel tanks 330.

Figure 3:
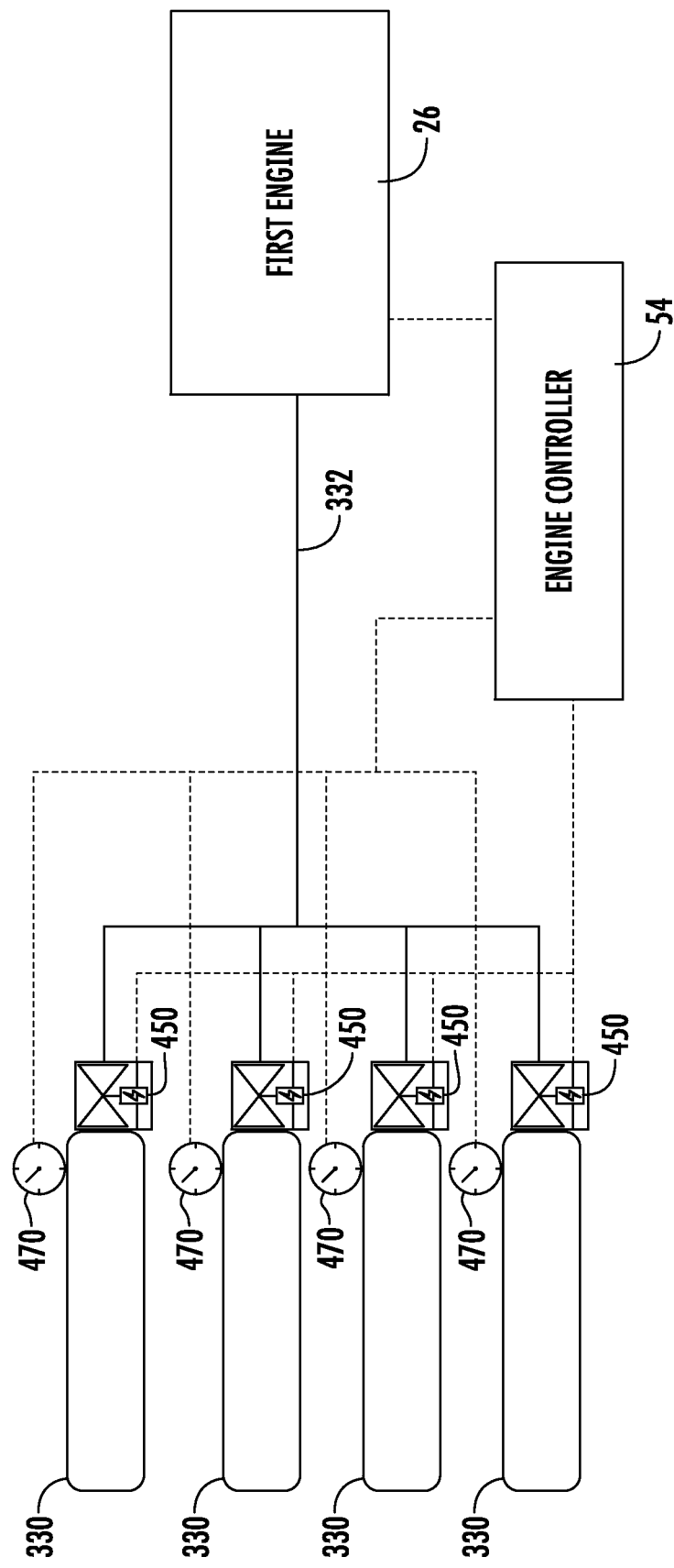
FIG. 3 is a schematic illustration of a configuration of a plurality of first fuel tanks, according to an embodiment of the present disclosure.
Figure 4:
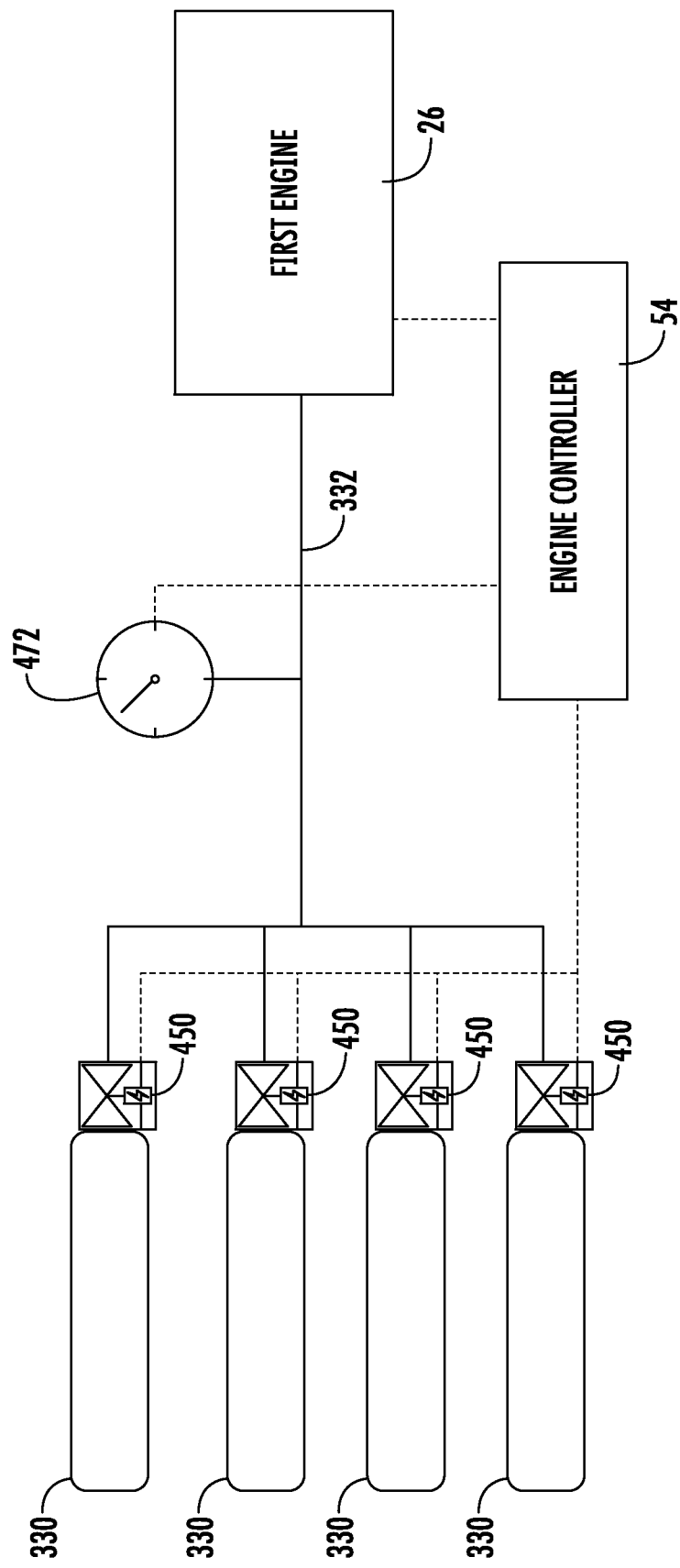
FIG. 4 is a schematic illustration of a conventional configuration of a plurality of first fuel tanks.

Referring now to FIGS. 3 and 4 with continued reference to FIGS. 1 and 2. FIG. 3 shows the plurality of first fuel tanks 330 and each of the first fuel tanks 330 includes a pressure sensor 470 and lock off valve 450. The lock off valve 450 may be an electric solenoid valve in a non-limiting example. The lock off valve 450 may be in electronic communication with the engine controller 54. The plurality of first fuel tanks 330 are fluidly connected to the first engine 26 through the first fuel line 332, as seen in FIG. 4. As shown in FIG. 3, each first fuel tank 330 includes a pressure sensor 470 configured to monitor the pressure of the each first fuel tanks 330. The pressure sensors 470 are each in electronic communication with the engine controller 54. The engine controller 54 is configured to monitor a pressure level of each of the first fuel tanks 330 and adjust the lock off valve 450 in response to the pressure level of each first fuel tank 330. Conventionally, as illustrated by FIG. 4, a single pressure sensor 470 may be connected to all of the first fuel tanks 330 and then a pressure measurement from the pressure sensor 470 would be averaged to estimate the amount of pressure in each first fuel tank 330. Advantageously, having a pressure sensor 470 monitor the pressure within each first fuel tank 330 allows from close monitoring of the pressure within each first fuel tank 330, which allows the engine controller 54 to quickly detect a problem and identify which one of the plurality of first fuel tank contains the problem.

Advantageously, having a pressure sensor 470 on each of the first fuel tanks 330 prevents the first fuel tanks 330 from being over filled by closely monitoring the pressure level on each of each first fuel tank 330 separately. Also advantageously, having a pressure sensor 470 on each of the first fuel tanks 330 helps monitor the discharge of each first fuel tank 330 and identify any blockages/leakages that may inhibit fuel discharge. Also advantageously, having a pressure sensor 470 on each of the first fuel tanks 330 allows an empty first fuel tank 330 to be quickly identified, removed, and/or replaced. Further advantageously, having a pressure sensor 470 on each of the first fuel tanks 330 allows a lock off valve 450 failure to be detected. In one example, a lock off valve 450 failure may be detected by detecting a change in the pressure level of a first fuel tank 330 when the lock off valve 450 is detected to be closed. Advantageously, having a pressure sensor 470 on each of the first fuel tanks 330 helps detect a fuel leak quickly and identify the location of the potently leakage.

Figure 5:
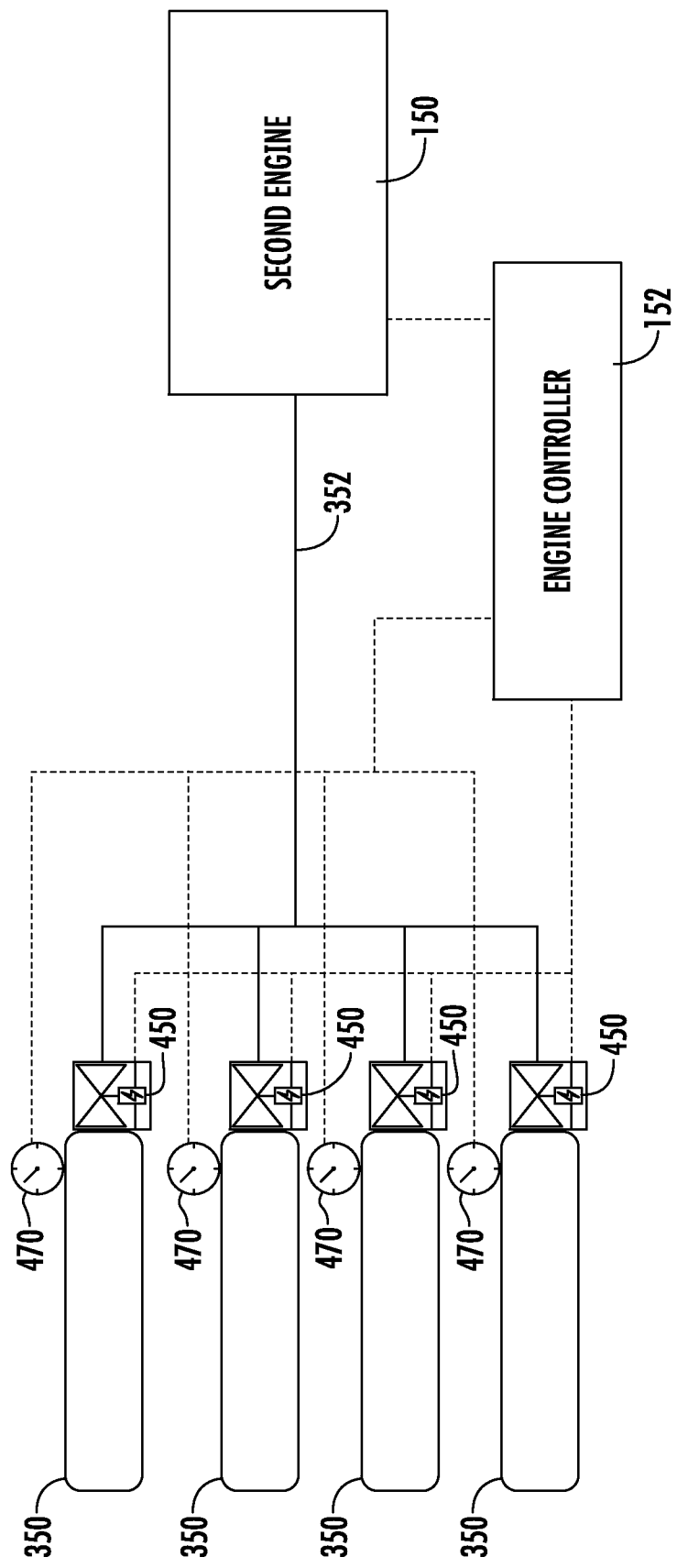
FIG. 5 is a schematic illustration of a configuration of a plurality of second fuel tanks, according to an embodiment of the present disclosure.
Figure 6:
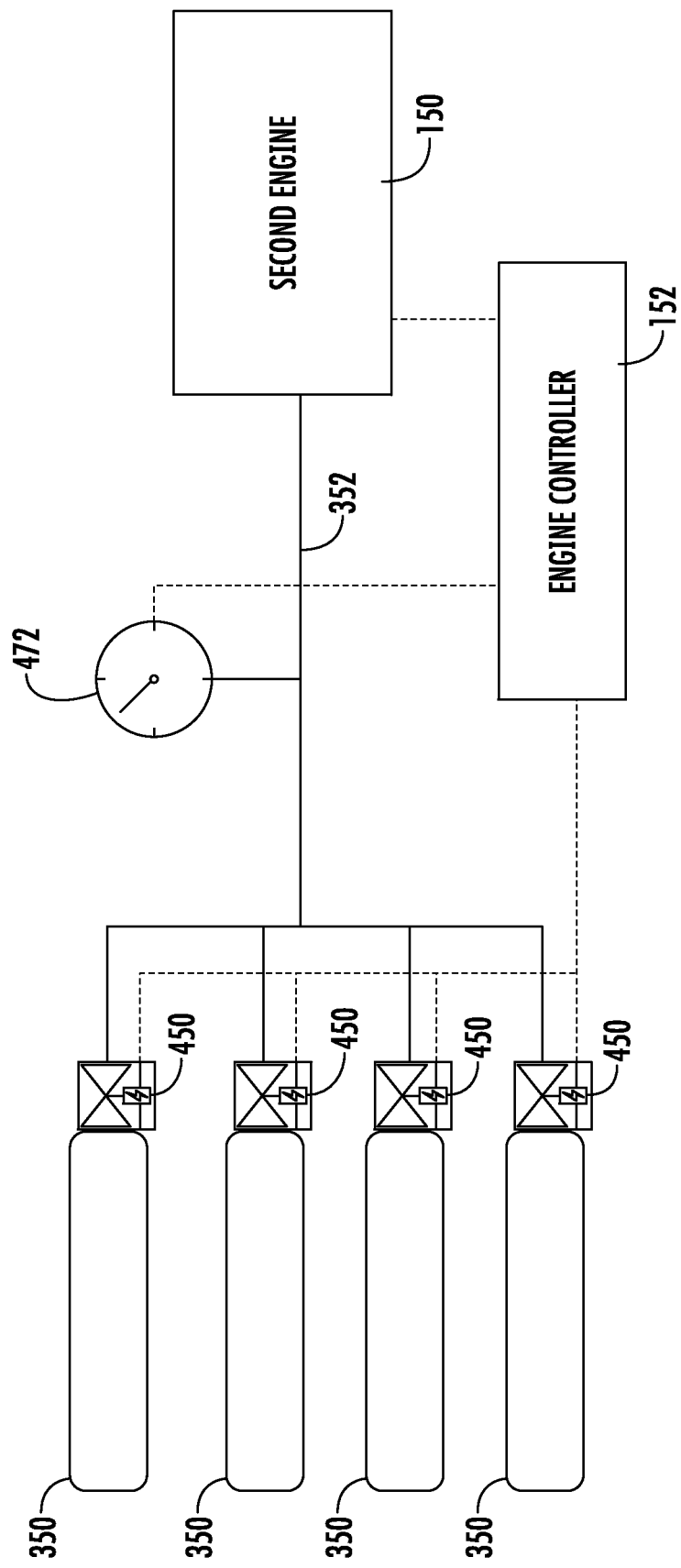
FIG. 6 is a schematic illustration of a conventional configuration of plurality of second fuel tanks.

Referring now to FIGS. 5 and 6 with continued reference to FIGS. 1 and 2. FIG. 5 shows the plurality of second fuel tanks 350 and each of the second fuel tanks 350 includes a pressure sensor 470 and lock off valve 450. The lock off 450 valve may be an electric solenoid valve in a non-limiting example. The lock off valve 450 may be in electronic communication with the engine controller 152. The plurality of second fuel tanks 350 are fluidly connected to the second engine 150 through the second fuel line 352, as seen in FIG. 6. As shown in FIG. 5, each second fuel tank 350 includes a pressure sensor 470 configured to monitor the pressure of the each second fuel tanks 350. The pressure sensors 470 are each in electronic communication with the engine controller 152. The engine controller 152 is configured to monitor a pressure level of each of the second fuel tanks 350 and adjust the lock off valve 450 in response to the pressure level of each second fuel tank 350. Conventionally, as illustrated by FIG. 6, a single pressure sensor 470 may be connected to all of the second fuel tanks 350 and then a pressure measurement from the pressure sensor 470 would be averaged to estimate the amount of pressure in each second fuel tank 350. Advantageously, having a pressure sensor 470 monitor the pressure within each second fuel tank 350 allows from close monitoring of the pressure within each second fuel tank 350, which allows the engine controller 152 to quickly detect a problem and identify which one of the plurality of second fuel tank contains the problem.

Advantageously, having a pressure sensor 470 on each of the second fuel tanks 350 prevents the second fuel tanks 350 from being over filled by closely monitoring the pressure level on each of each second fuel tank 350 separately. Also advantageously, having a pressure sensor 470 on each of the second fuel tanks 350 helps monitor the discharge of each second fuel tank 350 and identify any blockages/leakages that may inhibit fuel discharge. Also advantageously, having a pressure sensor 470 on each of the second fuel tanks 350 allows an empty second fuel tank 350 to be quickly identified, removed, and/or replaced. Further advantageously, having a pressure sensor 470 on each of the second fuel tanks 350 allows a lock off valve 450 failure to be detected. In one example, a lock off valve 450 failure may be detected by detecting a change in the pressure level of a second fuel tank 350 when the lock off valve 450 is detected to be closed. Advantageously, having a pressure sensor 470 on each of the second fuel tanks 350 helps detect a fuel leak quickly and identify the location of the potently leakage.

Figure 7:
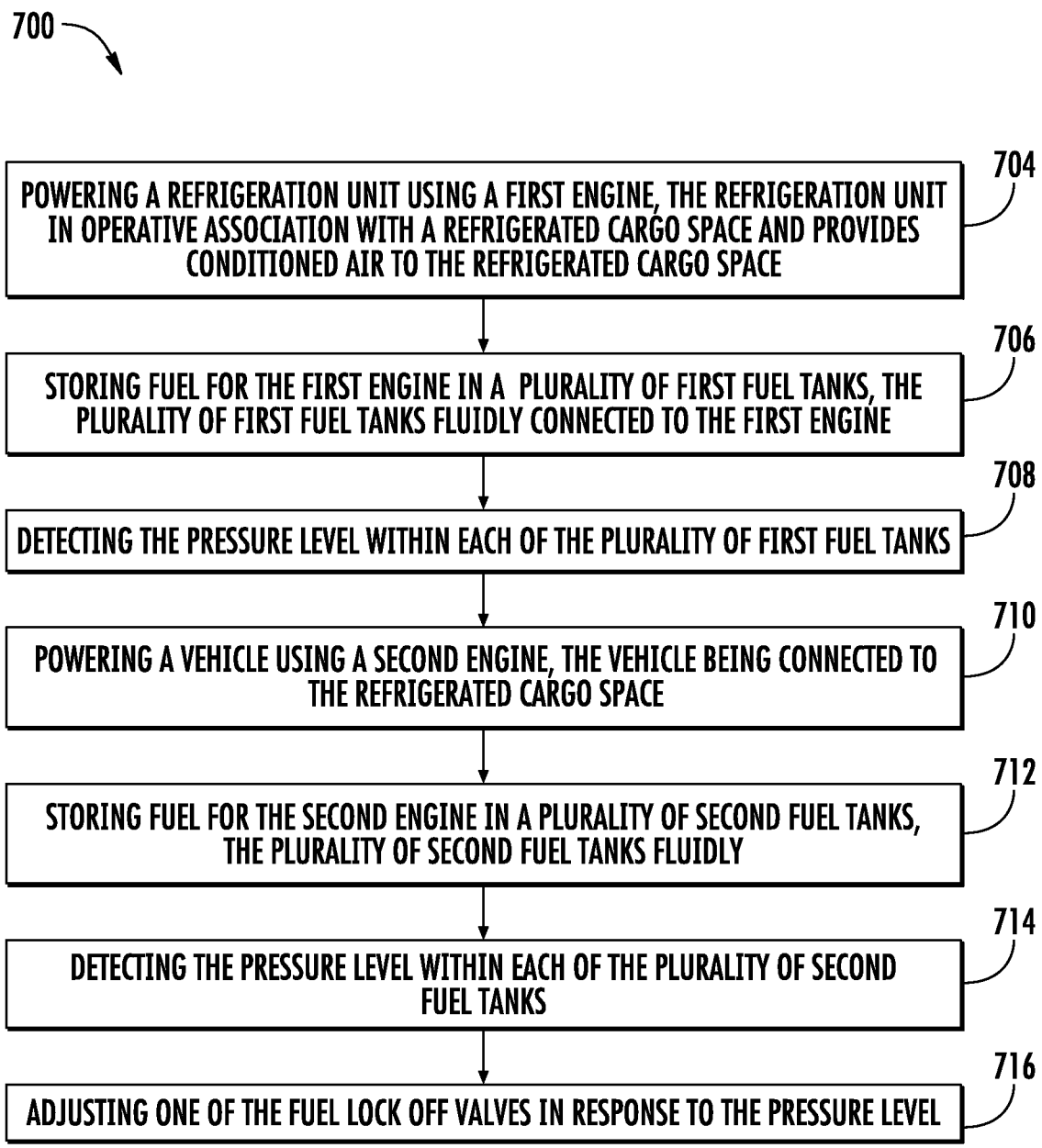
FIG. 7 is a flow diagram illustrating a method of operating a transportation refrigeration system, according to an embodiment of the present disclosure.

Referring now to FIG. 7, with continued reference to FIGS. 1-6. FIG. 7 shows a flow chart of method 700 of method of operating a transport refrigeration system 100, in accordance with an embodiment of the disclosure. At block 704, a refrigeration unit 200 is powered using a first engine 26. The refrigeration unit 200 is in operative association with a refrigerated cargo space 119 and provides conditioned air to the refrigerated cargo space 119. At block 706, fuel for the first engine 26 is stored in a plurality of first fuel tanks 330. As described above, the plurality of first fuel tanks 330 are fluidly connected to the first engine 26 and each of the plurality of first fuel tanks 330 includes a lock off valve 450 and a pressure sensor 470 configured to detect a pressure level within each of the first fuel tanks 330. At block 708, the pressure level within each of the plurality of first fuel tanks 330 is detected.

At block 710, a vehicle 102 using a second engine 150. The vehicle 102 is connected to the refrigerated cargo space 119. At block 712, fuel for the second engine 150 is stored in a plurality of second fuel tanks 350. As mentioned above, the plurality of second fuel tanks 350 are fluidly connected to the second engine 150 and each of the plurality of second fuel tanks 350 includes a lock off valve 450 and a pressure sensor 470 configured to detect a pressure level within each of the first fuel tanks 350. At block 714, the pressure level within each of the plurality of second fuel tanks 350 are detected.

At block 716, one of the fuel lock off valves 450 is adjusted in response to the pressure level. Adjusting may be including closing the lock off valve 450 completely, opening the shutoff valve 450 completely or adjusting the lock off valve 450 to any position between completely open and closed. The pressure level may be indicative of a fuel leak and/or an obstruction between a fuel tank and its respective engine, thus requiring a lock off valve 450 to be adjusted.

While the above description has described the flow process of FIG. 7 in a particular order, it should be appreciated that unless otherwise specifically required in the attached claims that the ordering of the steps may be varied.

As described above, embodiments can be in the form of processor-implemented processes and devices for practicing those processes, such as a processor. Embodiments can also be in the form of computer program code containing instructions embodied in tangible media, such as network cloud storage, SD cards, flash drives, floppy diskettes, CD ROMs, hard drives, or any other computer-readable storage medium, wherein, when the computer program code is loaded into and executed by a computer, the computer becomes a device for practicing the embodiments. Embodiments can also be in the form of computer program code, for example, whether stored in a storage medium, loaded into and/or executed by a computer, or transmitted over some transmission medium, loaded into and/or executed by a computer, or transmitted over some transmission medium, such as over electrical wiring or cabling, through fiber optics, or via electromagnetic radiation, wherein, when the computer program code is loaded into an executed by a computer, the computer becomes an device for practicing the embodiments. When implemented on a general-purpose microprocessor, the computer program code segments configure the microprocessor to create specific logic circuits.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

The invention claimed is:

1. A transport refrigeration system comprising:
  a vehicle having a refrigerated cargo space;
  a refrigeration unit in operative association with the refrigerated cargo space, the refrigeration unit providing conditioned air to the refrigerated cargo space;
  a first engine configured to power the refrigeration unit;
  a plurality of first fuel tanks fluidly connected to the first engine, the plurality of first fuel tanks configured to supply fuel to the first engine, wherein each of the plurality of first fuel tanks includes a lock off valve and a pressure sensor configured to detect a pressure level within each of the first fuel tanks;

one or more engine controllers in electronic communication with each pressure sensor and lock off valve, the one or more engine controllers being configured to adjust at least one of the lock off valves in response to a pressure level detected by at least one of the pressure sensors;

a second engine configured to power the vehicle;

a plurality of second fuel tanks fluidly connected to the second engine, the plurality of second fuel tanks configured to supply fuel to the second engine, wherein each of the plurality of second fuel tanks includes a lock off valve and a pressure sensor configured to detect a pressure level within each of the second fuel tanks;

a second engine controller in electronic communication with each pressure sensor and lock off valve of the second fuel tanks, the second engine controller being configured to adjust at least one of the lock off valves of the second fuel tanks in response to a pressure level detected by at least one of the pressure sensors of the second fuel tanks, wherein the second controller is configured to stop the fuel flow from one of the second fuel tanks to the second engine when at least one of a fuel leak and an obstruction is detected.

2. The transport refrigeration system of claim 1, further comprising:

a single filling point fluidly connected to the plurality of first fuel tanks and the plurality of second fuel tanks;

wherein the single filling point is configured to receive fuel.

3. The transport refrigeration system of claim 2, wherein:

the single filling point is configured to distribute the fuel received to the plurality of first fuel tanks and the plurality of second fuel tanks.

4. The transport refrigeration system of claim 1, wherein:

the controller is configured to stop the fuel flow from one of the first fuel tanks to the first engine when at least one of a fuel leak and an obstruction is detected.

5. The transport refrigeration system of claim 1, wherein:

the fuel is at least one of compressed natural gas and liquefied natural gas.

6. The transport refrigeration system of claim 1, wherein:

the fuel is at least one of compressed natural gas and liquefied natural gas.

7. A method of operating a transport refrigeration system, the method comprising:

powering a refrigeration unit using a first engine, the refrigeration unit being in operative association with a refrigerated cargo space and provides conditioned air to the refrigerated cargo space;

storing fuel for the first engine in a plurality of first fuel tanks, the plurality of first fuel tanks fluidly connected to the first engine, wherein each of the plurality of first fuel tanks includes a lock off valve and a pressure sensor configured to detect a pressure level within each of the first fuel tanks;

detecting the pressure level within each of the plurality of first fuel tanks;

adjusting one of the fuel lock off valves in response to the pressure level;

providing a second engine configured to power the vehicle;

providing a plurality of second fuel tanks fluidly connected to the second engine, the plurality of second fuel tanks configured to supply fuel to the second engine, wherein each of the plurality of second fuel tanks includes a lock off valve and a pressure sensor configured to detect a pressure level within each of the second fuel tanks;

providing a second engine controller in electronic communication with each pressure sensor and lock off valve of the second fuel tanks, the second engine controller being configured to adjust at least one of the lock off valves of the second fuel tanks in response to a pressure level detected by at least one of the pressure sensors of the second fuel tanks, wherein the second controller is configured to stop the fuel flow from one of the second fuel tanks to the second engine when at least one of a fuel leak and an obstruction is detected.

8. The method of claim 7, further comprising:

filling the plurality of first fuel tanks and the plurality of second fuel tanks through a single filling point, the single filling point fluidly connected to the plurality of first fuel tanks and the plurality of second fuel tanks.

9. The method of claim 7, further comprising:

detecting, using a controller, at least one of a fuel leak and an obstruction; and stopping fuel flow from one of the plurality of first fuel tanks to the first engine when at least one of the fuel leak and the obstruction is detected.

10. The method of claim 7, wherein:

the fuel is at least one of compressed natural gas and liquefied natural gas.

11. The method of claim 7, wherein:

the fuel is at least one of compressed natural gas and liquefied natural gas.

* * * * *